United States Patent
Law

(10) Patent No.: US 7,286,026 B2
(45) Date of Patent: Oct. 23, 2007

(54) SERIAL SIGNAL INJECTION USING CAPACITIVE AND TRANSFORMER COUPLINGS FOR POWER LINE COMMUNICATIONS

(75) Inventor: Robinson Peng Seng Law, Sembawang Crescent (SG)

(73) Assignee: Avago Technologies Ecbu IP (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 10/934,263

(22) Filed: Sep. 2, 2004

(65) Prior Publication Data

US 2006/0044076 A1 Mar. 2, 2006

(51) Int. Cl.
*H01P 5/04* (2006.01)
*H01P 5/12* (2006.01)

(52) U.S. Cl. .................. 333/124; 333/24 C; 333/24 R; 333/32

(58) Field of Classification Search ................. 333/124, 333/24 R, 24 C, 32
See application file for complete search history.

(56) References Cited

U.S. PATENT DOCUMENTS

| | | | |
|---|---|---|---|
| 5,705,974 A * | 1/1998 | Patel et al. .................. 307/104 |
| 5,717,685 A * | 2/1998 | Abraham ..................... 370/276 |
| 5,805,053 A * | 9/1998 | Patel et al. ............. 340/310.11 |
| 5,869,909 A * | 2/1999 | Silverberg et al. ............. 307/89 |
| 5,982,276 A | 11/1999 | Stewart |
| 6,741,162 B1 * | 5/2004 | Sacca et al. ..................... 307/3 |
| 6,747,859 B2 * | 6/2004 | Walbeck et al. ............ 361/93.1 |
| 6,844,810 B2 * | 1/2005 | Cern ........................... 375/258 |
| 6,952,159 B1 | 10/2005 | Muller |
| 6,987,430 B2 * | 1/2006 | Wasaki et al. ............... 333/124 |

FOREIGN PATENT DOCUMENTS

WO WO 2005/071860 A3 8/2005

OTHER PUBLICATIONS

White Paper, Optical-based Analog Front End for Low-Speed Powerline CommunicationsIn The Home, Agilent Technologies, Semiconductor Group (Dec. 19, 2003).
Search Report by The Patent Office of Great Britain for equivalent patent application No. GB0516519.6 dated Jan. 30, 2006.
Bilal, O., et al., "Design of Broadband Coupling Circuits For Powerline Communication", published at the ISPLC ("International Symposium on Power Line Communications") Conference held at Zaragosa, Spain on Mar. 31, 2004 - Apr. 2, 2004.

* cited by examiner

*Primary Examiner*—Benny Lee
*Assistant Examiner*—Kimberly E Glenn

(57) ABSTRACT

A coupling network has a first power line interface port and a power line modem interface configured to be coupled to a power line modem transceiver. An inductor-capacitor circuit coupled to the power line modem interface has a low-impedance resonant frequency at a signal frequency of the power line modem transceiver. An inductor having a corner frequency between the signal frequency and the power line frequency has a first end and a second end. The first end of the inductor is connected to the inductor-capacitor circuit and a second end of the inductor is coupled to an alternating current ground coupled to the transceiver ground. The inductor couples the first power line interface port to a power supply interface port.

14 Claims, 4 Drawing Sheets

SERIAL SIGNAL INJECTION USING CAPACITIVE AND TRANSFORMER COUPLINGS FOR POWER LINE COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

Power line communication ("PLC") systems use electrical power lines to exchange information between electronic devices in a network, such as between computers or shared electronic devices. Power line modems ("PLMs") are used in PLC systems to connect electronic devices in a home, office, building, or inter-building computer network and similar applications.

PLMs typically have a receiver and one or more transmitter line drivers that are coupled to the power lines through a coupling network. The PLM is often powered by a power supply(s) coupled to the power lines. The power lines typically operate at a voltage level that is dangerous, such as 120 VAC or 230 VAC. It is important to protect the user of devices connected to the power supply from electrical shock or injury.

FIG. 1 is a diagram of a prior art PLC system 100 using parallel signal injection. The power lines, also known as "mains lines" or simply "mains," 102, 104 are arbitrarily designated "line" ("L") 102, and "neutral" ("N") 104 for purposes of discussion. The power lines 102, 104 typically operate at a relatively high AC voltage to provide electrical power to devices and appliances. AC power from the power lines 102, 104 is provided to a power supply 106 along power supply leads 108, 110. An EMI filter capacitor 112 is provided across the power supply leads 108, 110 to suppress electromagnetic interference ("EMI") that might otherwise enter the power supply 106 and hence the PLM 114. The EMI filter capacitor is typically greater than about 1 nano-Farad ("nF"). A coupling network 116 couples the signals received by, and transmitted from, the PLM 114 to the power lines 102, 104. The PLM 114 is designed to operate in a half-duplex system, where the PLM can either transmit or receive data, but does not transmit and receive data at the same time.

FIG. 2 is a simplified circuit diagram of a conventional coupling network 118 using transformer-coupled parallel signal injection. A transmitter line driver 120 and a receiver 122 are coupled to the power line interfaces 102', 104' through a transformer 124, capacitors 126, 128, 130, and an inductor 132. The capacitor 126 between the output 134 of the transmitter line drive 120 and the transformer 124 and the capacitor 128 between the input 136 of the receiver and the transformer 124 are chosen to have a value that passes signals at a selected frequency (the "signal frequency"). An exemplary signal frequency is 100 kHz, alternative signal frequencies are generally between the line frequency (e.g. about 50 or 60 Hz) and about 100 MHz.

Generally, the values of the capacitors 126, 128 are selected to provide relatively low impedance at the signal frequency. The values for the capacitor 130 and inductor 132 in series are selected to provide a resonant short circuit at the signal frequency (i.e. where the total impedance of the series combination goes to about zero at the signal frequency). This circuit is commonly known as a "series L-C circuit."

The transformer 124 isolates the high voltage of the power lines from the transmitter line driver 120 and receiver 122. Additionally, a first voltage-limiting device 134, such as a metal-oxide varistor ("MOV"), limits the voltage across the power line interface ports 102', 104'. For example, in a system designed to operate at a power line voltage of 230 VAC, the MOV 134 is selected to limit the voltage across it to less than 275 V. In other words, the MOV 134 transitions from a high resistive state (essentially an open circuit), to a low resistive state (typically a few ohms) at 275 V. The MOV 134 limits the voltage that can appear across the input winding of the transformer.

A second voltage-limiting device 136, such as an avalanche diode or a Zener diode, limits the voltage at the PLM side of the transformer 124. The second voltage-limiting device 136 is commonly known as a "transient voltage suppressor" ("TVS"), and conducts (i.e. becomes essentially a short) at a second selected voltage, typically about 5 V for conventional receivers and transmitters.

FIG. 3 is a simplified circuit diagram of another conventional coupling network 140 using transformer-coupled parallel signal injection and two transmitters. The receiver 122' receives a differential input from both sides of the secondary winding 142 of the transformer 124. The TVS 136 is connected across the inputs 144, 146 of the receiver 122'. The transmitter line drivers 120, 120' have input signals 148, 150 one hundred and eighty degrees out of phase that drive the secondary winding 142 of the transmitter, and essentially double the power of the transmitted signal, compared to a PLM using a single transmitter line driver of similar design.

FIG. 4 is a simplified circuit diagram of a conventional coupling network 160 using capacitively coupled parallel signal injection. A shunt inductor 162 shunts the power line voltage, which is typically at 60 Hz or 50 Hz (i.e. at a much lower frequency than the signal frequency) that is not blocked by the capacitor 130' and inductor 132', which form a series L-C circuit. The TVS 136 is connected across the shunt inductor 162 to protect the transmitter line driver 120 and receiver 122 from transient voltage spikes that might otherwise be coupled through the coupling capacitors 126, 128.

However, using multiple PLMs with parallel signal injection, whether transformer coupled or capacitively coupled, undesirably loads the signals to and from a PLM when used with a standard power supply incorporating a filter capacitor.

BRIEF SUMMARY OF THE INVENTION

A coupling network has a first power line interface port and a power line modem interface configured to be coupled to a power line modem transceiver. An inductor-capacitor circuit coupled to the power line modem interface has a low-impedance resonant frequency at a signal frequency of the power line modem transceiver. An inductor having a corner frequency between the signal frequency and the power line frequency has a first end and a second end. The first end of the inductor is connected to the inductor-capacitor circuit and a second end of the inductor is coupled to an alternating current ground coupled to a transceiver ground. The inductor couples the first power line interface port to a power supply interface port.

DETAILED DESCRIPTION OF THE EMBODIMENTS

Figure 1:
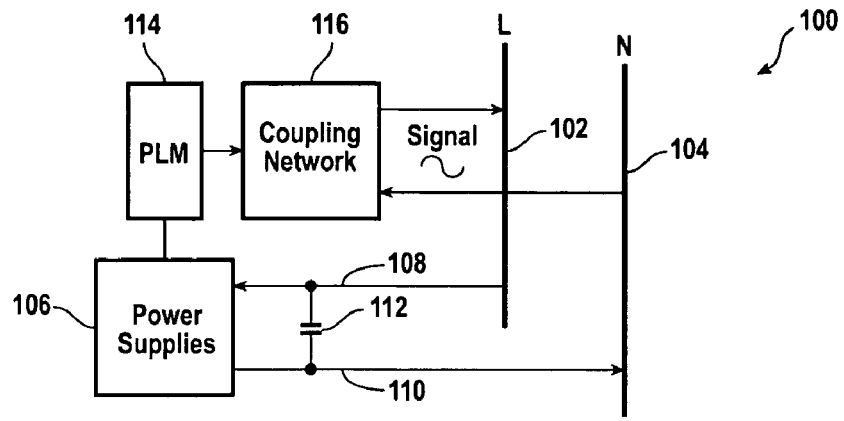
FIG. 1 is a diagram of a prior art PLC system using parallel signal injection.
Figure 2:
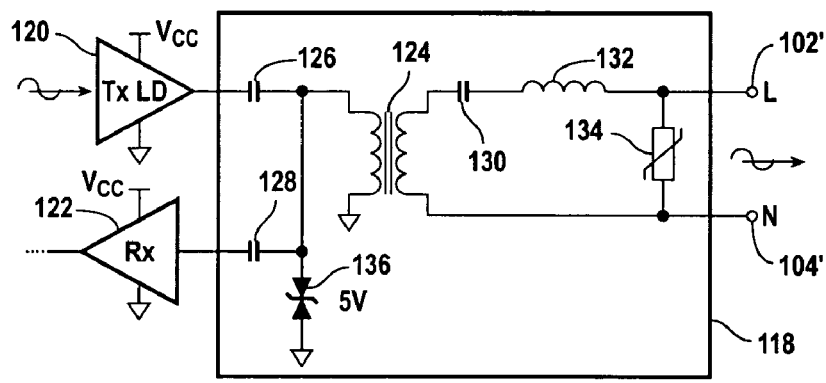
FIG. 2 is a simplified circuit diagram of a conventional coupling network using transformer-coupled parallel signal injection.
Figure 3:
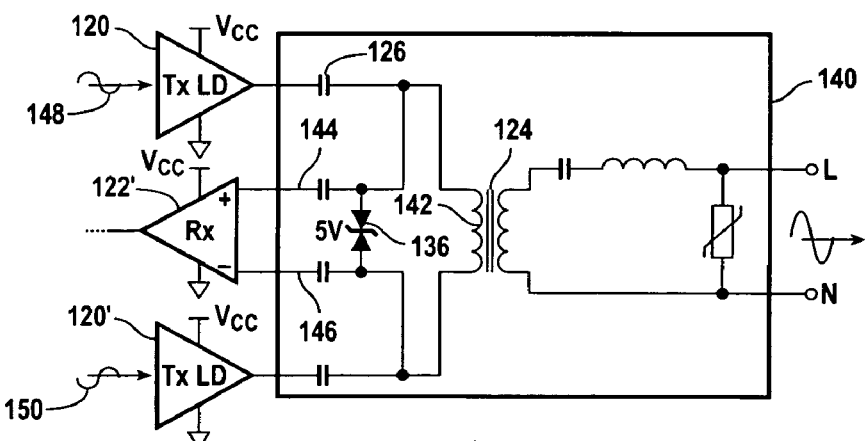
FIG. 3 is a simplified circuit diagram of another conventional coupling network using transformer-coupled parallel signal injection and two transmitters.
Figure 4:
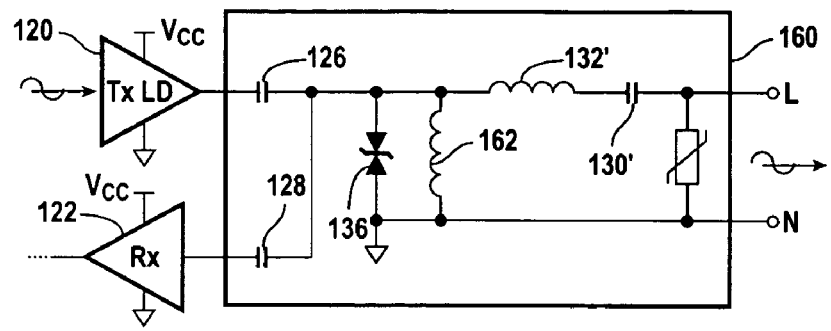
FIG. 4 is a simplified circuit diagram of a conventional coupling network using capacitively coupled parallel signal injection.
Figure 5:
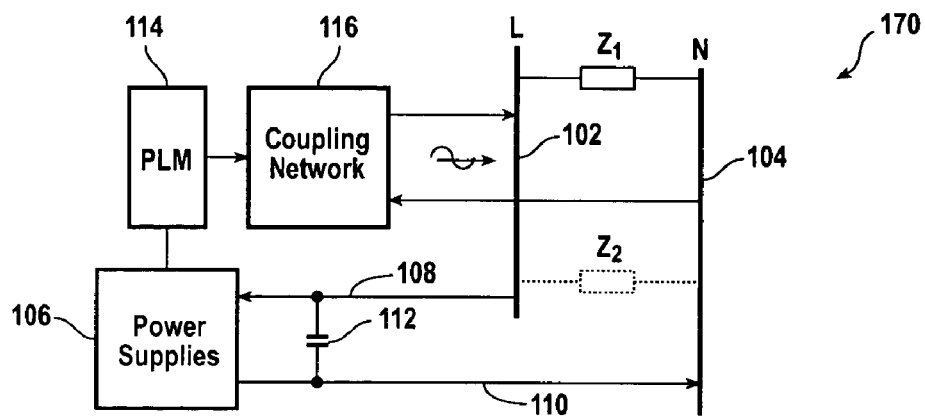
FIG. 5 is a diagram of a prior art PLC system illustrating a problem arising when a PLM using parallel signal injection is connected to power lines.

FIG. 5 is a diagram of a prior art PLC system 170 illustrating a problem arising when a PLM using a coupling network with parallel signal injection is connected to power lines 102, 104. The EMI filter capacitor 112 has a capacitance selected to couple EMI from one power supply lead 108 to the other power supply lead 110. In other words, the capacitance is high enough, typically greater than about 1 nF and more typically about 100 nF, to couple EMI at the lowest frequency of interest. The lowest EMI frequency may be lower than, or about the same as, the signal frequency, and the filter capacitor 112 has the undesirable effect of reducing the impedance of the effective (i.e. total) load on the coupling network 116.

For example, $Z_1$ is the impedance of the load end of the power lines 102, 104, which represents the loads of other nodes (e.g., connected appliances, such as additional PLMs) on the power lines. It is generally desirable to keep the load impedance as high as possible to avoid having to provide high current output from the transmitter line drivers in the PLM. High-current drivers are generally larger and consume additional power, compared to transmitter line drivers that do not have to supply as much current. $Z_2$ is the impedance across the power lines 102, 104 created by the filter capacitor 112 and power supply(s) 106. $Z_2$ is shown in dashed lines to represent that it is the resultant impedance of the power supply(s) 106 and EMI filter capacitor 112, which are already shown in FIG. 5. The effective load (total parallel impedance), $Z_{pi}$, seen by the coupling network 116 is given by the equation:

$$Z_{pi}=Z_1 *Z_2/(Z_1+Z_2) \qquad \text{Eq. 1}$$

The capacitance of the filter capacitor is often great enough so that the total parallel impedance, $Z_{pi}$, is as low as about 1.5 ohms at 100 kHz. This creates a high current draw on the PLM. If the transmitter line driver cannot supply sufficient current, the signal strength drops.

Figure 6:
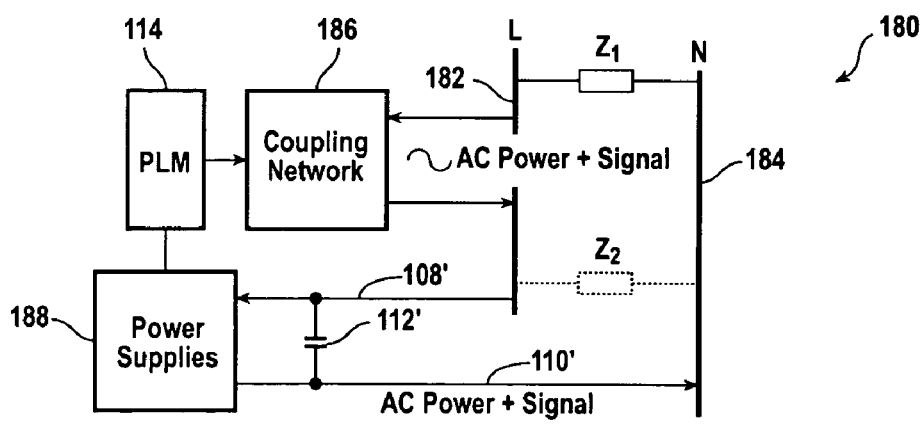
FIG. 6 is a diagram of a PLC system with serial signal injection according to an embodiment of the present invention.

FIG. 6 is a diagram of a PLC system 180 with serial signal injection according to an embodiment of the present invention. A serial coupling network 186 (see, e.g. FIGS. 7–9) is connected in series along the line 182 of the power lines 182, 184. A power supply 188 is connected across the power lines 182, 184 (i.e. in parallel). The AC power in line 182 travels through the coupling network 186.

$Z_1$ is the impedance of the load end of the power lines 182, 184, which represents the loads of other nodes (e.g. other connected appliances, such as additional PLMs) on the power lines. $Z_2$ is the impedance across the power lines 102, 104 created by the EMI filter capacitor 112' and power supply(s) 188. The EMI filter capacitor can have higher capacitance in this embodiment, compared to FIG. 5, to shunt more EMI noise without affecting the series injected signal. $Z_2$ is shown in dashed lines to represent that it is the resultant impedance of the power supply(s) 188 and EMI filter capacitor 112', which are already shown in FIG. 6. The effective load (total series impedance), $Z_{si}$, is given by the equation:

$$Z_{si}=Z_1+Z_2 \qquad \text{Eq. 2}$$

Thus, $Z_{si}$ is greater than either $Z_1$ or $Z_2$, while $Z_{pi}$ of equation 1 is less than either $Z_1$ or $Z_2$. In one embodiment using a DC power supply (see, e.g., FIG. 7), an EMI filter capacitor of 220 nF and 1.5 Ohm load, the total effective load impedance seen by the coupling network 186 is about 6 ohms. This is four times greater than the effective load impedance, $Z_{pi}$, in a similar PLC using parallel signal injection. The higher effective impedance enabled by serial signal injection eases the operating constraints on the transmitter line drivers in the PLM 114. In particular, since less current is drawn by the high-impedance effective load, $Z_{si}$, a smaller, lower power transmitter line driver can be used in the PLM while maintaining sufficient signal strength.

Figure 7:
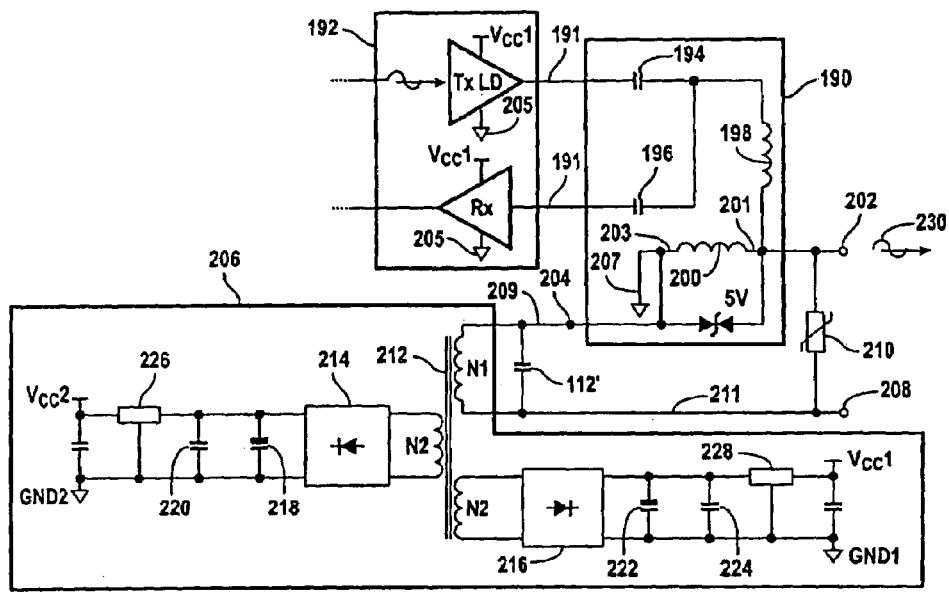
FIG. 7 is a simplified circuit diagram of a coupling network using capacitively coupled serial signal injection.

FIG. 7 is a simplified circuit diagram of a coupling network 190 using capacitively coupled serial signal injection. Signals to and from the PLM transceiver 192 are coupled to the power lines through a PLM interface 191, capacitors 194, 196, and inductor 198. The values of the capacitors 194, 196 and the inductor 198 are chosen so as to provide an inductor-capacitor ("L-C") circuit having a low-impedance resonance at the signal frequency. A signal frequency is typically between a frequency sufficiently greater than the line frequency to allow effective separation of the signal frequency from the line frequency and about 100 MHz. A mains inductor 200 couples a first power line interface port 202 to a power supply interface port 204 with the power supply 206. An AC ground 207 (typically a capacitor in series with the signal path having a capacitance sufficiently small to avoid coupling the AC line power to the transceiver ground 205 ("ground")) returns high-frequencies, such as the signal or high-frequency noise, to ground. A first end 201 of the mains inductor 200 is connected to the L-C circuit and a second end 203 of the mains inductor 200 is connected to the AC ground 207.

Hence power mains current flows through the mains inductor 200 of the coupling network to the power supply 206. The mains inductor 200 has a corner frequency between the signal frequency and the power line frequency. In other words, the mains inductor 200 has sufficient inductance to provide high impedance at the signal frequency, and thus operates essentially as an open circuit to the signals received and transmitted by the PLM 192 so that the signals are coupled to and from the first power line interface port 202, and low impedance at the power line frequency to transmit the line power to the power supply. The first power line interface port is connected to the line voltage (ref. FIG. 6, ref. num. 182) and the line power flows through the mains inductor 200 of the coupling network 190 to the power supply 206. The signal 230 is injected serially onto the mains line from the first power line interface port 202.

The power supply 206 is a linear power supply connected to the power lines (see FIG. 6, ref. nums 182, 184) from the first power line interface port 202 through the coupling network 190 and from a second power line interface port 208. Hence, one power line lead 209 is connected to the coupling network 190 at power supply interface port 204 and the other power line lead 211 is connected to the other power line at the second power line interface port 208. This configuration places the coupling network 190 in series with a power line. An EMI filter capacitor 112' shunts EMI between the power line leads 209, 211, as discussed above; however, the mains inductor 200 blocks the signal from the EMI capacitor 112', and the EMI capacitor 112' can have greater capacitance than an EMI capacitor in a similar parallel signal injection application. An MOV 210 between the first power line interface port 202 and the second power line interface port 208 shunts overvoltage, such as can arise from lightning strikes or voltage spikes, between the power lines. The MOV has relatively high resistance at the signal frequency, and does not significantly affect transmission or reception.

A step-down transformer 212 provides AC power to diode bridges 214, 216 that convert the AC power to DC power. The DC power is filtered by capacitors 218, 220, 222, 224 and regulated by linear voltage regulators 226, 228. The connections between the regulated, filtered DC power from the power supply 206 to the PLM transceiver 192 are omitted for simplicity of illustration. The signal 230 is transmitted/received through the first power line interface port 202. Alternatively, the first power line interface port is connected to the neutral and the second power line interface port is connected to the line.

Figure 8:
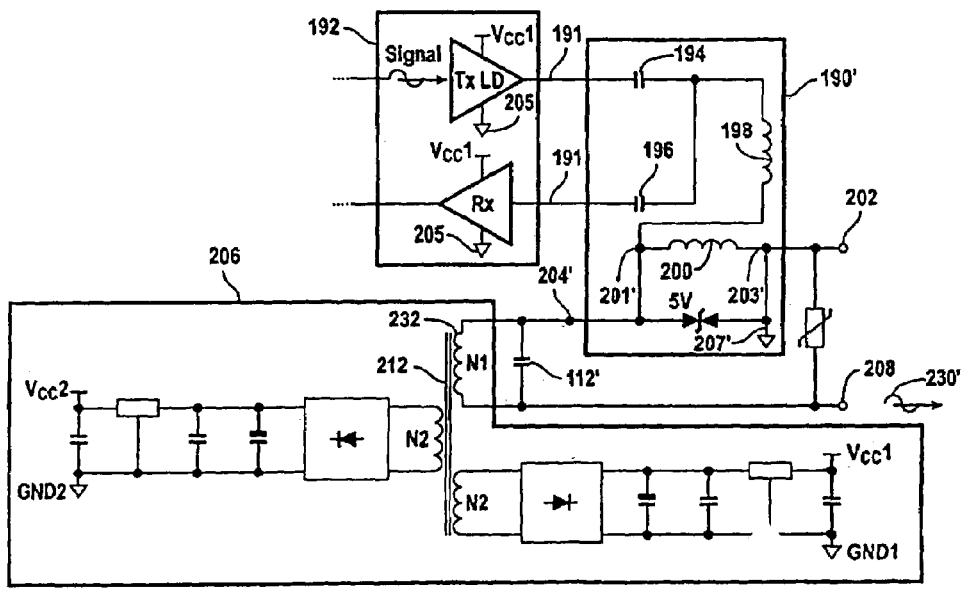
FIG. 8 is a simplified circuit diagram of another coupling network using capacitively coupled serial signal injection.

FIG. 8 is a simplified circuit diagram of another coupling network 190' using capacitively coupled serial signal injection. Signals to and from the PLM transceiver 192 are coupled to the power lines (see FIG. 6, ref. nums. 182, 184) through PLM interface 191, capacitors 194, 196, and inductor 198. The values of the capacitors 194, 196 and the inductor 198 are chosen so as to provide an L-C circuit with a low-impedance resonance at the signal frequency. A mains inductor 200, as-described above in reference to FIG. 7, couples a first power line interface port 202 to a power supply interface port 204'. The signals to and from the PLM transceiver 192 are also coupled to and from the power supply interface port 204', rather than to and from the first power line interface port 202, as in the embodiment shown in FIG. 7. An AC ground 207' returns high-frequencies present at the first power line interface port 202, such as the signal or high-frequency noise, to the transceiver ground 205. A first end 201' of the mains inductor 200 is connected to the L-C circuit and a second end 203' of the mains inductor 200 is connected to the AC ground 207'.

As in the embodiment of FIG. 7, power mains current flows through the mains inductor 200 of the coupling network to the power supply 206. The mains inductor 200 has a corner frequency between the signal frequency and the power line frequency and provides high impedance at the signal frequency, and thus operates essentially as an open circuit to the signals received and transmitted by the PLM 192 so that the signals are coupled to and from the first power line interface port 202. The first power line interface port is connected to the line voltage (ref. FIG. 6, ref. num. 182) and the line (mains) power flows through the coupling network 190' to the power supply 206. The signal from the PLM transceiver 192 travels through the resonant L-C network of capacitors 194, 196 and inductor 198 to the power supply interface port 204'.

The signal then travels through the EMI filter capacitor 112' but not the primary winding 232 of the step-down transformer 212 in the power supply 206. Since the signal is intended to be coupled through the EMI filter capacitor 112' with minimal loss, the capacitance is optionally chosen to be higher than the capacitance that is typically chosen for EMI filter capacitors used in PLC systems with parallel signal injection.

For example, a 100 nF capacitor used in a PLC system having a signal frequency of 100 kHz has an impedance of about 16 ohms. An increase in the capacitance would lower the impedance, resulting in higher current draw from the PLM and a reduction in signal strength in a PLC system with parallel signal injection. It is desirable to use an EMI capacitor having an impedance of at least 20 ohms in a PLC system using parallel signal injection to avoid excessive current draw. However, in embodiments of the invention using serial signal injection the capacitance of the EMI capacitor can be increased to result in impedance at the signal frequency of about 6 ohms to about 12 ohms. This increased capacitance is not only advantageous for coupling the signal through the EMI capacitor 112' of the embodiment of FIG. 8, but is also advantageous for suppressing EMI in the embodiments of FIGS. 7 and 8.

The signal 230' is injected serially onto the neutral from the second power line interface port 208. The signal current can travel to, and flow from, line to neutral or from neutral to line. Alternatively, the first power line interface port is connected to the neutral and the second power line interface port is connected to the line.

Figure 9:
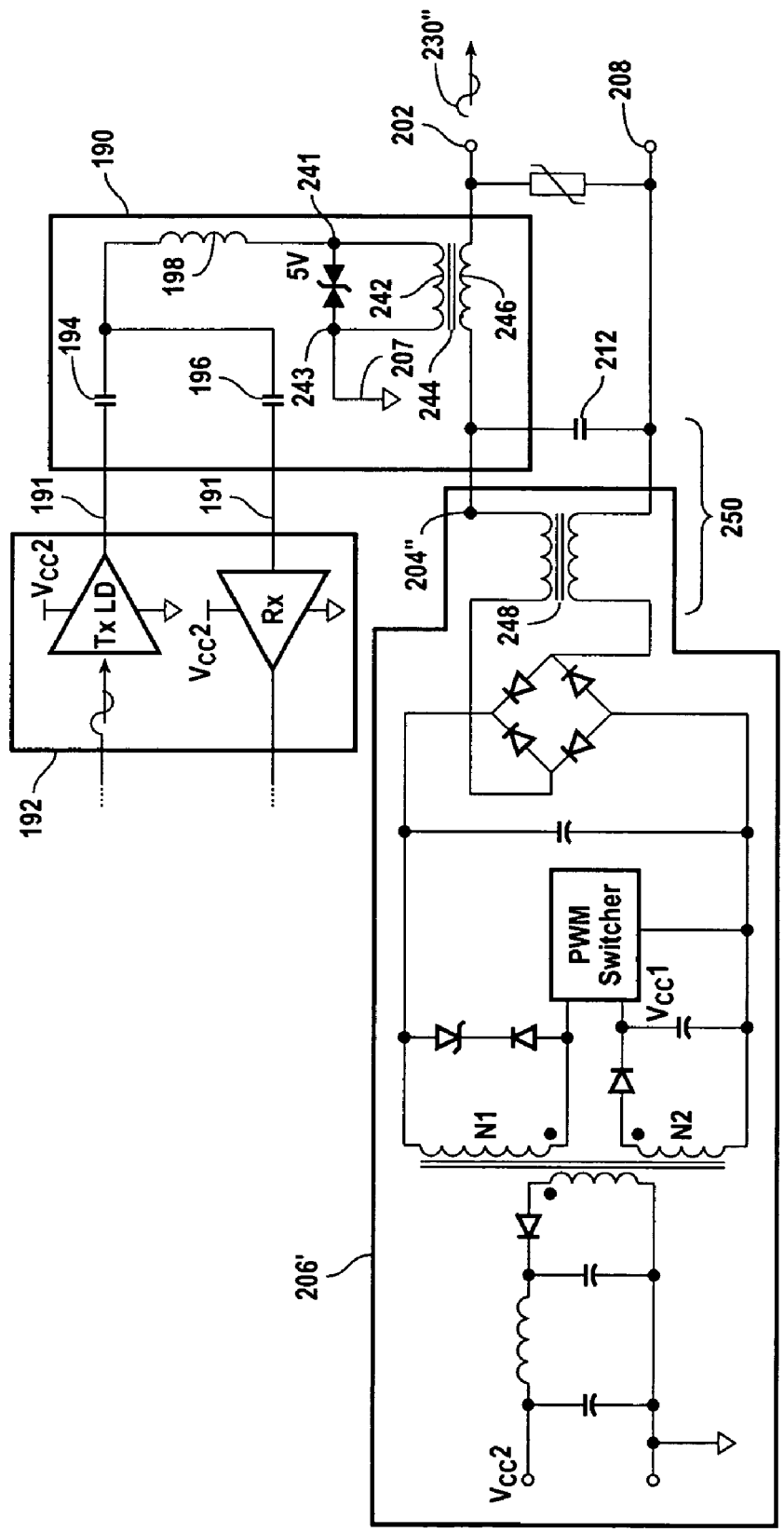
FIG. 9 is a simplified circuit diagram of another coupling network using transformer-coupled serial signal injection.

FIG. 9 is a simplified circuit diagram of another coupling network 240 using transformer-coupled serial signal injection. The signal from the PLM transceiver 192 travels through the PLM interface 191 and the L-C circuit of capacitors 194, 196 and inductor 198 to a first end 241 of a first winding 242, which acts as an inductor like the mains inductor 200 of the embodiments of FIGS. 7 and 8, of a signal-coupling transformer 244. A second end 243 of the first winding 242 is connected to AC ground 207. The signal-coupling transformer 244 couples the signal to a second winding 246 of the signal-coupling transformer 244. The signal 230" is injected serially onto the mains line from the first power line interface port 202 (ref. FIG. 6, ref. num. 182). Alternafively, the first power line interface port is connected to the neutral and the second power line interface port is connected to the line.

The mains power is coupled from the first power line interface port 202 trough the second winding 246 of the signal-coupling transformer 244 to a power supply interface port 204''', and then to a switching power supply 206'. A power-supply transformer 248 operates in conjunction with an EMI filter capacitor 112'' to form an EMI filter 250. The EMI capacitor is an effective filtering means in suppressing switching noise. As it is already there, no additional cost is incurred and the EMI capacitor performs the dual functions of suppressing switching noise from the power supply and filtering EMI from the power lines. The second power line interface port 208 is connected to the neutral mains power line. Thus, the line voltage is provided to the power supply transformer 248 through the coupling network 240. Switching power supplies are familiar to those of skill in the art; therefore, a detailed description of the switching power supply 206' and explanation of its operation is omitted. Power ($V_{cc}2$) from the power supply is provided to the terminals indicated with $V_{cc}2$ in the PLM. Alternatively, the first power line interface port is connected to the neutral and the second power line interface port is connected to the line.

While the preferred embodiments of the present invention have been illustrated in detail, it should be apparent that modifications and adaptations to these embodiments might occur to one skilled in the art without departing from the scope of the present invention as set forth in the following claims.

What is claimed is:

1. A coupling network comprising:
    a first power line interface port for connecting said network to a power line that carries a power signal characterized by a power line frequency;
    a power line modem interface configured to be coupled to a power line modem transceiver that receives a signal characterized by a signal frequency;
    an inductor-capacitor circuit coupled to the power line modem interface and having a low-impedance resonant frequency of the power line modem transceiver;
    an alternating current ground coupled to a transceiver ground;
    an inductor having a corner frequency between the signal frequency and the power line frequency, and having a first end and a second end, the first end of the inductor being connected to the inductor-capacitor circuit and the second end of the inductor being coupled to the alternating current ground; and
    a power supply interface port coupled to the first power line interface port through the inductor.

2. The coupling network of claim 1 wherein the inductor is a winding of a transformer.

3. The coupling network of claim 1 wherein the first end of the inductor is connected to the first power line interface port.

4. The coupling network of claim 1 wherein the first end of the inductor is connected to the power supply interface port.

5. The coupling network of claim 1 further comprising a capacitor coupled to the first power line interface port and to a second power line interface port.

6. The coupling network of claim 5 wherein the capacitor has an impedance less than about 20 ohms at a signal frequency of the coupling network.

7. The coupling network of claim 5 wherein the capacitor has an impedance less than about 12 ohms at a signal frequency of the coupling network.

8. The coupling network of claim 5 wherein the capacitor has an impedance not greater than about 6 ohms at a signal frequency of the coupling network.

9. The coupling network of claim 5 further comprising a first power line lead connected to the second power line interface port.

10. The coupling network of claim 9 further comprising a second power line lead connected to the power supply interface port; and
    a power supply connected to the first power line lead and to the second power line lead.

11. The coupling network of claim 9 wherein the power supply is a linear power supply.

12. The coupling network of claim 9 wherein the power supply is a switching power supply.

13. The coupling network of claim 12 wherein a transformer operates in conjunction with the capacitor to form an EMI filter.

14. The coupling network of claim 1 further comprising the power line modem transceiver.

* * * * *